United States Patent
Adachi et al.

(10) Patent No.: US 8,789,258 B2
(45) Date of Patent: Jul. 29, 2014

(54) SECURING METHOD AND SECURING APPARATUS FOR BEARING HOUSING

(75) Inventors: Mitsuhiro Adachi, Tokyo (JP);
Masamitsu Shimada, Tokyo (JP);
Yasuhiro Kobayashi, Tokyo (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 502 days.

(21) Appl. No.: 13/183,678

(22) Filed: Jul. 15, 2011

(65) Prior Publication Data

US 2012/0013033 A1 Jan. 19, 2012

(30) Foreign Application Priority Data

Jul. 16, 2010 (JP) ................................ 2010-161998

(51) Int. Cl.
*B21D 39/00* (2006.01)
*B29C 45/14* (2006.01)
*E04B 1/61* (2006.01)
*B25B 11/02* (2006.01)

(52) U.S. Cl.
CPC ............ *B29C 45/14065* (2013.01); *E04B 1/61* (2013.01); *B25B 11/02* (2013.01)
USPC ............. 29/527.1; 29/559; 29/799; 29/281.1; 269/289 R; 264/279

(58) Field of Classification Search
CPC .... B29C 45/14065; E04B 1/161; B25B 11/02
USPC .......... 29/460, 527.1, 527.2, 559, 799, 281.1, 29/281.5; 264/35, 275, 279; 269/289 R, 269/296
See application file for complete search history.

(56) References Cited

U.S. PATENT DOCUMENTS 4,335,765 A * 6/1982 Murphy ..................... 144/286.1

FOREIGN PATENT DOCUMENTS

| CN | 2547877 Y | 4/2003 |
|----|-----------|--------|
| JP | 59-133701 U | 9/1984 |
| JP | 61-55591 U | 4/1986 |
| JP | 1-92501 A | 4/1989 |
| JP | 1-113109 U | 7/1989 |
| JP | 4-269216 A | 9/1992 |
| JP | 2007-262798 A | 10/2007 |

OTHER PUBLICATIONS

International Search Report of PCT/JP2011/065229, date of mailing Aug. 23, 2011, with Partial Translation (11 pages).
Translation of the International Preliminary Report on Patentability (PCT/ISA/237) (4 pages), (PCT/IB/373) (1 page) of International Application No. PCT/JP2011/065229 mailed Jan. 31, 2013 (Form PCT/IB/338) (1 page), (Form PCT/IB/326) (1 page).

(Continued)

*Primary Examiner* — Jermie Cozart
(74) *Attorney, Agent, or Firm* — Westman, Hattori, Daniels & Adrian, LLP

(57) ABSTRACT

Turbine casings LP1, PL2 and HP are secured to storing spaces $S_1$ to $S_3$ formed in a concrete frame 12. Cubic blocks 16, 40 and 80 are secured to depressions $C_2$, $C_3$ and $C_1$ respectively. The cubic block 16 has transverse anchors 20a and 20b projecting upward from an upper wall 18. A bearing housing 35 for supporting a rotor shaft 34 rotatably is positioned and secured by transverse anchors 22a and 22b in a direction perpendicular to a rotor shaft (a direction of an arrow a).

8 Claims, 8 Drawing Sheets

(56) References Cited

OTHER PUBLICATIONS

Concise Explanation of Relevance for JP4-269216 previously cited on Aug. 29, 2012.
Korean Notice of Allowance dated Jan. 28, 2014, issued in corresponding Korean Patent Application No. 2012-7023759, w/English translation, (3 pages).
JP Offce Action dated May 15, 2013, issued in corresponding Japanese application No. 2010-161998, w/ English translation.
JP Decision to Grant a Patent dated Aug. 27, 2013, issued in corresponding Japanese application No. 2010-161998, w/ English translation.

* cited by examiner

Related Art

Related Art

SECURING METHOD AND SECURING APPARATUS FOR BEARING HOUSING

TECHNICAL FIELD

The present invention relates to a securing method and a securing apparatus for a bearing housing, which is preferable when positioning and securing a rotation shaft of a large rotating machine such as a steam turbine and a compressor on a base frame which supports the rotation shaft, particularly in a direction perpendicular to the rotation shaft.

BACKGROUND ART

A turbine casing of a steam turbine is configured such that a low-pressure turbine casing and a high-pressure turbine casing are arranged in series and a rotor shaft bridges over each turbine casing. A bearing housing for supporting a heavy rotor shaft rotatably is provided integrally with or separately from the turbine casing. The bearing housing was originally formed integrally with the turbine casing. However, with growing size of a steam turbine plant, it is popular to provide the bearing housing separately from the turbine casing and to fix the bearing housing and the turbine casing separately to a concrete frame which functions as a foundation.

When installing the steam turbine plant, it is necessary to install and secure the bearing housing for supporting the heavy rotor shaft to the concrete frame with high-strength as well as installing and securing the turbine casing. Conventionally, the bearing housing was positioned and secured to the concrete frame in a direction perpendicular to the rotor shaft by means of a fixing hardware. Such securing apparatus for a steam turbine casing with which a bearing housing is formed integrally is disclosed in FIG. 3 and FIG. 4 of Patent Literature 1 and is explained here in reference to FIG. 8 and FIG. 9.

As shown in FIG. 8 and FIG. 9, a securing device 100 for a bearing housing is provided on a supporting surface 102a of a concrete frame 102 and spaces 103 and 104 are provided in line for housing the turbine casings. A high-pressure turbine casing is installed and secured to the space 104, whereas a low-pressure turbine casing is installed and secured to the space 103. FIG. 8 shows a low-pressure turbine outer casing (lower half) which is separated into two pieces 105a and 105b and the low-pressure turbine outer casing 105a and 105b is installed and secured to the space 104. The low-pressure turbine outer casing 105a and 105b is formed integrally with the bearing housing 106a and 106b.

A bedplate 108 is secured to the supporting surface 102a by foundation bolts 112. In an operation state, the turbine casing thermally expands due to high temperature of steam, combustion gas and the like inside the casing. Thus, it is necessary to install the turbine casing such as to set securing points which are base points of thermal expansion and to allow thermal expansion in areas other than the securing point. Among the base points, a pair of base points disposed at an axis of the rotor shaft, on the front and back of the turbine casing, are the securing points in the direction perpendicular to the rotor shaft.

A pair of bedplates 110 are installed securely to the supporting surface 102a by the foundation bolts 112 on the axis line of the rotor shaft at the front and back of the space 104. A transverse anchor 114 projecting from each of the bedplates 110 is formed integrally with the bedplate 110. The transverse anchor 114 is fit in a key groove (not shown) provided on a bottom part of each of the bearing housing 106a and 106b so as to position and secure the turbine casing in the direction perpendicular to the rotor shaft.

FIG. 9 (FIG. 4 of Patent Literature 1) shows an axial anchor 116 embedded in the concrete frame 102. The axial anchor 116 is fitted in a hole 122 drilled in the bedplate 108. The axial anchor 116 functions as the securing point in the direction of the rotor shaft and the low-pressure turbine outer casing 105a and 105b is positioned and secured in the direction of the rotor shaft by the axial anchor.

In the proximity of the axial anchor 116, a key groove 118a is formed in the bedplate 108 and a key groove 118b is formed in the low-pressure turbine 105a or 105b. A key 120 is inserted in the key grooves 118a and 118b to position and secure the low-pressure turbine outer casing 105a or 105b to the bedplate 108 by means of the key 120. The key 120 is disposed in the direction perpendicular to the rotor shaft. This allows the thermal expansion of the low-pressure turbine outer casing 105a or 105b in the direction perpendicular to the rotor shaft.

Another example of a conventional securing apparatus for the bearing housing integrally formed in a steam turbine casing, is explained in reference to FIG. 10. FIG. 10 shows a rotor shaft 156 between a first low-pressure turbine outer casing 154 and a second low-pressure turbine outer casing 154. A first bearing housing 158 and a second bearing housing 160 are provided integrally with the first low-pressure turbine outer housing 152. A third bearing housing 162 is provided integrally with the second low-pressure turbine outer housing 154. The first to third bearing housings support the rotor shaft 156 rotatably.

A first securing apparatus 150A for the bearing housing is configured as follows. A transverse anchor 166 disposed in a vertical direction is fitted and secured to a lower wall 164 of the first bearing housing 158, the lower wall 164 is placed on a top surface of the concrete frame 168, and the transverse anchor 166 is buried in the concrete frame 168. This allows thermal expansion of the first bearing housing 158 in the direction of the rotor shaft and fixing a movement of the first bearing housing 158 in the direction perpendicular to the rotor shaft 158.

A second securing apparatus 150B for the bearing housing is configured as follows. A transverse anchor 174 disposed in a vertical direction is fitted and secured to a lower wall 170 of the second bearing housing 160 and a transverse anchor 176 disposed in the vertical direction is fitted and secured to a lower wall 172 of the third bearing housing 162. The lower walls 170 and 172 are placed on the top surface of a concrete frame 178, and the transverse anchors 174 and 176 are buried in the concrete frame 178. This allows thermal expansion of the second and third bearing housings 160 and 162 in the direction of the rotor shaft and fixing a movement of the second and third bearing housings 160 and 162 in the direction perpendicular to the rotor shaft 158.

Another securing apparatus for securing a turbine housing is disclosed in Patent Literature 2. Such securing apparatus is explained in reference to FIG. 11. The securing apparatus 200 for the turbine housing is configured such that a key groove is formed in a bottom surface of a leg 206 of a low-pressure turbine outer casing 204 and a key is formed in a top surface of a bedplate 208 and a key 210 is inserted in the key grooves. The bedplate 208 has a projection 208a formed with a key insertion groove 211. An anchor block 212 is inserted in the key insertion groove 211 via an adjusting liner 214. The anchor block 212 is welded to a hardware 216 embedded in the concrete frame 202. In this manner, by means of the anchor block 212, the bedplate 208 is secured and the low-pressure turbine outer casing is positioned and secured.

CITATION LIST

Patent Literature

[PTL 1]
Japanese Unexamined Utility Model JP61-55591
[PTL 2]
Japanese Unexamined Patent Publication JP1-92501 A

SUMMARY OF INVENTION

Technical Problem

As described above, the bearing housing and the steam turbine casing are positioned and secured in the direction of the rotor and in the direction perpendicular to the rotor shaft by means of a securing member such as the transverse anchor and the anchor block. The securing member is either fixed onto the concrete frame by foundation bolts or formed integrally with the hardware embedded in the concrete frame. Thus, its supporting strength is limited. Therefore, it is necessary to improve supporting strength of the securing apparatus for supporting the heavy rotor shaft and also a securing unit with little age deterioration and high reliability is desired.

As such securing apparatus with little age deterioration and high reliability, a securing apparatus as disclosed in FIG. 12 was originally devised by the inventors of the present invention and others. The structure of such securing apparatus is described below. The securing apparatus 300 secures the bearing housing of the turbine casing in the direction perpendicular to the rotor shaft.

FIG. 12 shows a bedplate 308 being fixed to a supporting surface of a concrete frame 302 by means of foundation bolts (not shown). On a top surface of the bedplate 308, a base plate 306 formed integrally with the bearing housing 304 is installed. A key groove 306a is formed in the base plate 306.

A steel bolt plate 310 to which a plurality of stud bolts 312 are installed upright, is embedded in the concrete frame 302. On an upper end of the bolt plate 310, a transverse anchor 314 is formed integrally with the bolt plate 310. The transverse anchor 314 projects upward from the bedplate 308 and is inserted in the key groove 306a of the base plate 306.

In the securing apparatus having the above structure, the size of the bolt plate 310 and the concrete frame 302 is comparatively large, and the stud bolts 312 are installed upright to the bolt plate 310, thereby increasing a contact area with the concrete frame 302. Therefore, the joint strength between the securing apparatus 300 and the concrete frame is high. This improves supporting strength for the bearing housing 304 in comparison to the conventional case.

However, in comparison to the conventional case, significant improvement in supporting strength and reliability were not expected in the securing apparatus 300. Thus, further improvement was necessary.

In view of the above issues of the related art, it is an object of the invention is to provide a securing apparatus with high reliability, by which the bearing housing for supporting the rotation shaft of the large rotation machine such as a steam turbine and a compressor on a base frame and which has high rigidity, high supporting strength with respect to the bearing housing and high reliability.

Solution to Problem

To achieve the above object, as a first aspect of the present invention, a method of securing a bearing housing in which the bearing housing for a rotation shaft of a rotary machine is positioned and secured on a concrete frame by means of an anchor member projecting from a supporting surface of the concrete frame, the method includes, but not limited to, the steps of:

preparing a cubic block which has rigidity and has one pair of opposing surfaces that are open, an inner space for receiving concrete and the anchor member projecting upward at the end of the upper wall;

housing the cubic block in a depression which is formed on the supporting surface of the concrete frame facing a storing space of the rotary machine, in such a state that the anchor member projects on a side of the storing place from the supporting surface of the concrete frame;

placing concrete in the inner space of the cubic block so that the cubic block is positioned and secured to the concrete frame; and locking the bearing housing by the anchor member so that the bearing housing is positioned and secured to the concrete frame in a direction perpendicular to the rotation shaft.

According to the method of the present invention, the cubic block having the above structure is used. The cubic block is embedded in the depression which is formed on the supporting surface of the concrete frame and concrete is placed in the inner space of the cubic block. In this manner, the joint strength between the cubic block and the concrete frame is enhanced. This improves rigidity of the anchor member and also improves supporting strength of the bearing housing.

In the conventional case, the anchor member was embedded in the concrete frame in comparatively small contact area. On the other, according to the method of the present invention, load applied to the anchor member from the bearing housing is transmitted to the concrete frame in large contact area, thereby improving the supporting strength with respect to the bearing housing.

The anchor member is fixed to or formed integrally with the rigid cubic block. Thus, it is possible to achieve the structure with little age deterioration and high reliability.

Furthermore, the anchor member projects on a side of the storing space of the rotary machine so that the anchor member is provided at a position of the cubic block that is nearest to the rotary machine and thus, the rotary machine can be firmly supported.

The securing method of the first aspect of the present invention may further include the step of:

prior to the step of placing the concrete in the inner space of the cubic block, installing a reinforcing bar through said one pair of opposing surfaces of the cubic block that are open.

In this manner, it is possible to further improve the joint strength between the cubic block and the concrete frame and to further improve the supporting strength with respect to the bearing housing.

In the securing method of the first aspect of the present invention, the bearing housing may be formed integrally with the steam turbine casing or may be a separate body from the steam casing. By securing with high supporting strength the bearing housing for rotatably supporting the heavy rotor shaft, the steam turbine plant can be positioned and secured with high supporting strength and precision.

In the securing method of the first aspect of the present invention, the cubic block may be provided on at least one side of the steam turbine casing in a direction of a rotor shaft, the steam turbine casing and the bearing housing may be positioned and secured in a direction perpendicular to the rotor shaft by the anchor member while allowing thermal expansion of the steam turbine casing and the bearing housing in the direction of the rotor shaft.

When the bearing housing is formed integrally with the steam turbine casing, the bearing housing is subjected to the weight and thermal expansion of the turbine casing. In such case, the anchor member allows thermal expansion of the steam turbine casing and the bearing housing in the direction of the rotor shaft while securing the bearing housing in the direction perpendicular to the rotor shaft with high precision. The anchor member is arranged on at least one side of the steam turbine casing in the direction of the rotor shaft and thus, the anchor member can be installed without interfering with other devices.

As a second aspect of the present invention, an apparatus of securing a bearing housing in which the bearing housing for a rotation shaft of a rotary machine is positioned and secured on a concrete frame by means of an anchor member projecting from a supporting surface of the concrete frame, may include, but is not limited to, a cubic block which has rigidity and has one pair of opposing surfaces that are open, an inner space for receiving concrete and the anchor member projecting upward at the end of the upper wall. In the securing apparatus, the depression which is formed on the supporting surface of the concrete frame facing a storing space of the rotary machine and houses the cubic block, in such a state that the anchor member projects from the supporting surface of the concrete frame, and concrete may be placed in the inner space of the cubic block so as to secure the cubic block and the bearing housing may be locked by the anchor member so as to position and secure the bearing housing to the concrete frame in a direction perpendicular to the rotation shaft.

In this manner, the cubic block is housed in the depression and concrete is placed in the inner space of the cubic block so as to improve joint strength between the cubic block and the concrete frame and rigidity of the anchor member supporting the bearing housing.

Therefore, the load from the bearing housing is transmitted to the concrete frame via the cubic block in a large contact area, thereby improving supporting strength with respect to the bearing housing.

Furthermore, the anchor member projects on a side of the storing space of the rotary machine so that the anchor member is provided at a position of the cubic block that is nearest to the rotary machine and thus, the rotary machine can be firmly supported.

In the securing apparatus of the second aspect of the present invention, the cubic block may have an opening through which the concrete is introduced, the opening being formed in an upper wall of the cubic block and in communication with the inner space of the cubic block. This makes it easy to introduce concrete into the cubic block, thereby facilitating the installation of the securing apparatus to the concrete frame.

In the securing apparatus of the second aspect of the present invention, the rotary machine may be a steam turbine and the bearing housing is a bearing housing of an integral casing type which supports a rotor shaft, the depression may be provided on at least one side of a storing space for a steam turbine casing formed in the supporting surface of the concrete frame in a direction of the rotor shaft, the anchor member may be provided at a position of the cubic block that is nearest to the steam turbine casing, and the bearing housing may be positioned and secured in a direction perpendicular to the rotor shaft by the anchor member so as to permit thermal expansion of the steam turbine casing and the bearing housing in the direction of the rotor shaft.

In this manner, the bearing housing can be secured in the direction perpendicular to the rotor shaft with high precision by the anchor member while allowing thermal expansion of the steam turbine casing and the bearing housing in the direction of the rotor shaft. Further, the anchor member is provided on at least one side of the steam turbine in the direction of the rotor shaft and thus can be installed without interfering with other devices. Furthermore, the anchor member is provided at a position of the cubic block that is nearest to the steam turbine casing and thus, the steam turbine casing can be firmly supported.

Advantageous Effects of Invention

According to the securing method of the first aspect of the present invention, the method of securing the bearing housing in which the bearing housing for the rotation shaft of the rotary machine is positioned and secured on the concrete frame by means of the anchor member projecting from the supporting surface of the concrete frame, the method includes, but not limited to, the steps of: preparing a cubic block which has rigidity and has one pair of opposing surfaces that are open, an inner space for receiving concrete and the anchor member projecting upward at the end of the upper wall; housing the cubic block in a depression which is formed on the supporting surface of the concrete frame facing a storing space of the rotary machine, in such a state that the anchor member projects on a side of the storing spaces from the supporting surface of the concrete frame; placing concrete in the inner space of the cubic block so that the cubic block is positioned and secured to the concrete frame; and locking the bearing housing by the anchor member so that the bearing housing is positioned and secured to the concrete frame in a direction perpendicular to the rotation shaft. Further, according to the securing method, it is possible to improve the joint strength between the cubic block and the concrete frame is improved and rigidity of the anchor member supporting the bearing housing and to transmit the load from the bearing housing to the concrete frame via the cubic block in a large contact area, thereby improving supporting strength with respect to the bearing housing.

The anchor member is fixed to or formed integrally with the rigid cubic block. Thus, it is possible to achieve the structure with little age deterioration and high reliability.

Furthermore, the anchor member projects on a side of the storing space of the rotary machine so that the anchor member is provided at a position of the cubic block that is nearest to the rotary machine and thus, the rotary machine can be firmly supported.

According to the securing apparatus of the second aspect of the present invention, the apparatus of securing a bearing housing in which the bearing housing for a rotation shaft of a rotary machine is positioned and secured on a concrete frame by means of an anchor member projecting from a supporting surface of the concrete frame, may include, but is not limited to, a cubic block which has rigidity and has one pair of opposing surfaces that are open, an inner space for receiving concrete and the anchor member projecting upward at the end of the upper wall. In the securing apparatus, the cubic block may be housed in a depression which is formed on the supporting surface of the concrete frame facing a storing space of the rotary machine, in such a state that the anchor member projects on a side of the storing space from the supporting surface of the concrete frame, and concrete may be placed in the inner space of the cubic block so as to secure the cubic block and the bearing housing may be locked by the anchor member so as to position and secure the bearing housing to the concrete frame in a direction perpendicular to the rotation shaft. Therefore, it is possible to obtain the same effects as the securing method of the first aspect of the present invention.

DESCRIPTION OF EMBODIMENTS

A preferred embodiment of the present invention will now be described in detail with reference to the accompanying drawings. It is intended, however, that unless particularly specified, dimensions, materials, shape, its relative positions and the like shall be interpreted as illustrative only and not limitative of the scope of the present invention.

First Preferred Embodiment

Figure 1:
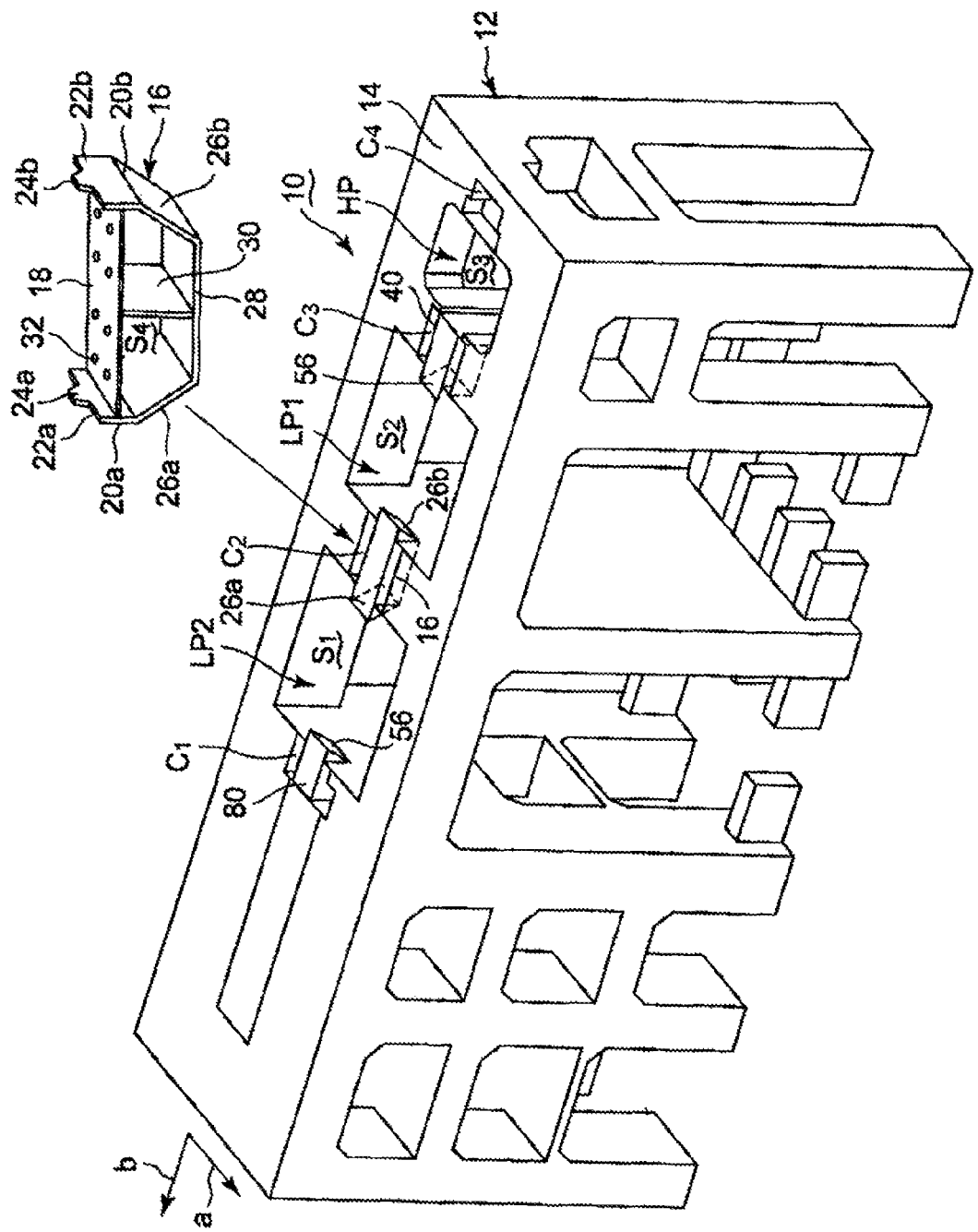
FIG. 1 is a perspective view of a securing apparatus in relation to a first preferred embodiment where a method and an apparatus of the present invention are applied to a steam turbine plant.
Figure 2:
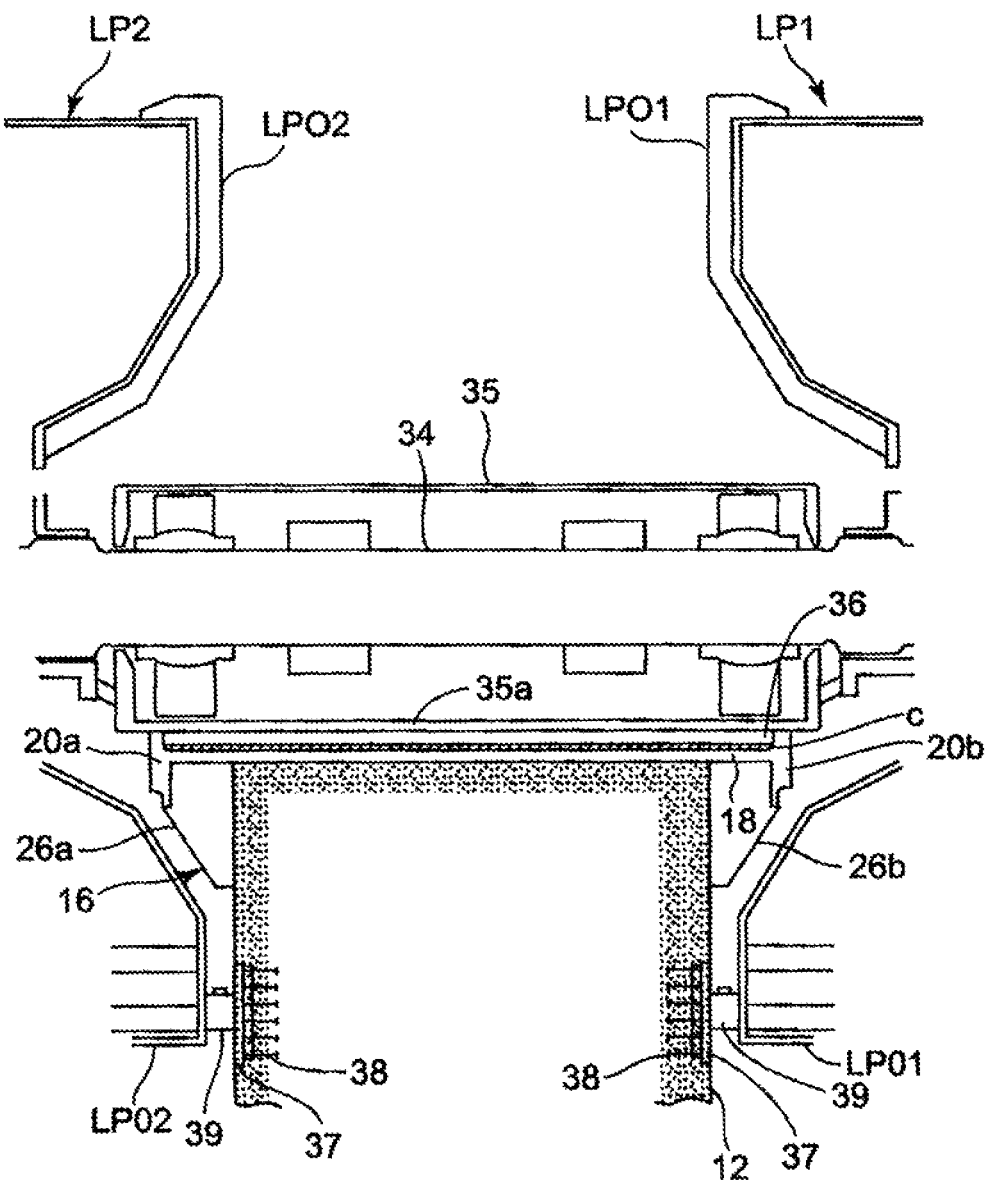
FIG. 2 is an explanatory diagram showing the securing apparatus and around the securing apparatus.

A first preferred embodiment where a method and an apparatus of the present invention are applied to a steam turbine plant is explained in reference to FIG. 1 and FIG. 2. The securing apparatus 10 for securing a bearing housing of the first preferred embodiment is configured such that a bearing housing provided separately from a turbine casing is positioned and secured in a direction perpendicular to a direction of a rotor shaft. FIG. 1 shows a concrete frame 12 made of concrete, to which the turbine casing is installed and secured. The concrete frame 12 has a flat top surface which is disposed horizontally. The flat top surface forms a supporting surface 14 to which the turbine casing is installed and secured. A row of storing spaces $S_1$, $S_2$ and $S_3$ for storing each turbine casing is provided in the supporting surface 14.

A two-stage low-pressure turbine casing LP2 is installed in the storing space $S_1$. A one-stage low-pressure turbine casing LP1 is installed in the storing space $S_2$. A high-pressure turbine casing HP is installed in the storing space $S_3$. In the preferred embodiment, a cubic block 16 is housed in a depression $C_2$ which is formed at a center part (where the rotor shaft is arranged) of the supporting surface 14 between the storing space $S_1$ and $S_2$. The structure of the cubic block 16 is described below.

The cubic block 16 is entirely made of steel and has a high rigidity. The cubic block 16 is approximately cubic and the upper wall 18 is rectangular. Side walls 20a and 20b of the cubic block 16 are joined to both ends of a long side of the upper wall 18. Transverse anchors 22a and 22b projecting from the upper wall 18 are formed integrally with the side walls 20a and 20b respectively. Below the side walls 20a and 20b, formed are inclined walls 26a and 26b which are downwardly-inclined toward a center. The inclined walls 26a and 26b are connected to a lower wall 28 at lower ends thereof respectively.

The cubic block 16 has an inner space S4 for receiving concrete. The cubic block 16 also has a partition wall 30 disposed between the upper wall 18 and the lower wall 28 in a vertical direction in the center. A pair of opposing surfaces in a direction perpendicular to the side walls 20a and 20b are entirely open. Key plates 24a and 24b projecting upward are formed integrally with the transverse anchors 20a and 20b respectively in a center area thereof. A plurality of circular holes 32 for introducing concrete are formed in the upper wall 18.

The cubic block 16 having the above structure is inserted and secured in the depression $C_2$. The transverse anchor 20a is arranged projecting on a side of the storing space $S_1$ whereas the transverse anchor 20b is arranged projecting on a side of the storing space $S_2$. Concrete in liquid form is introduced from the circular holes 32. The introduced concrete hardens so as to secure the cubic block 16 to the depression $C_2$.

Once the cubic block 16 is installed to the depression $C_2$, the transverse anchors 22a and 22b projects upward from the supporting surface 14. And the transverse anchor 22a is disposed at a position of the cubic block that is nearest to the storing space $S_1$ in which the two-stage low-pressure turbine casing LP2 is housed, whereas the transverse anchor 22b is disposed at a position of the cubic block that is nearest to the storing space $S_2$ in which the one-stage low-pressure turbine casing LP1 is housed.

FIG. 2 illustrates the bearing housing 34 is secured by the cubic block 16 which is installed in the depression $C_2$. A rotor shaft 34 is provided through the bearing housing 35. The rotor shaft 34 is supported rotatably by the bearing housing 35. The bearing housing 35 is a separate body from an outer casing LPO2 of the two-stage low-pressure turbine casing LP2 or an outer casing LPO1 of the one-stage low-pressure turbine casing LP1. The weight of the rotor shaft 34 is loaded on the bearing housing 35. A bedplate 36 is secured to an outer surface of a lower wall 35a of the bearing housing 35. Polymer cement c is applied to an outer surface of the upper wall 18 of the cubic block 16.

The bedplate 36 is brought into contact with the upper wall 18 via the polymer cement c, and the key plates 24a and 24b of the transverse anchors 22a and 22b are engaged in key grooves (not shown) provided in the bedplate 36. By this, the bearing housing 35 is positioned and secured to the direction perpendicular to the direction of the rotor shaft (a direction of an arrow a). A bolt plate 37 to which stud bolts are installed upright is embedded in a side surface of the concrete frame 12. The outer casings LPO1 and LPO2 are connected to the bolt plates 37 respectively via link plates 39. In this manner, the outer casings LPO1 and LPO2 can be directly supported by the concrete frame 12.

In the preferred embodiment, the transverse anchors 22a and 22b are subjected to a load from the bearing housing 35 in the direction perpendicular to the direction of the rotor shaft and such load is transmitted to the cubic block 16. The cubic block 16 is installed in the concrete frame 12 and concrete is placed in the inner space S4 of the cubic block so as to enhance joint strength between the cubic block 16 and the concrete frame 12. Therefore, it is possible to improve rigidity of the transverse anchors 22a and 22b that are subjected to the load from the bearing housing 35.

The load applied to the transverse anchors 22a and 22b from the bearing housing 35 is transmitted to the concrete frame 12 in large contact area via the cubic block 16. Thus, it is possible to improve bearing strength with respect to the bearing housing 35. Further, the transverse anchors 22a and 22b are formed integrally with the cubic block 16. Thus, it is possible to realize the structure with less age deterioration and high reliability.

The holes 32 for introducing concrete are provided in the upper wall 18 of the cubic block 16. Thus, it is easy to place concrete into the inner space S4 of the cubic block 16, thereby facilitating a process for installing the cubic block 16.

The transverse anchors 22a and 22b are arranged in the direction (the direction of the arrow a) perpendicular to the direction of the rotor shaft. Clearance for allowing thermal expansion of the bearing housing 35 in the direction of the rotor shaft can be easily formed between the transverse anchors 22a and 22b and the bedplate 36. Thus, it is possible to perform the positioning of the bearing housing 35 in the direction of the arrow a with precision while allowing the thermal expansion.

The transverse anchors 22a and 22b are arranged at positions of the cubic block 16 that are nearest to the turbine casings LP1 and LP2 respectively. Thus, it is possible to reduce a distance between the transverse anchors 22a and 22b and transverse anchors that are arranged in depressions $C_1$ and $C_3$. Thus, it is possible to make a distance shortest between fixing points of the low-pressure turbine casings in the direction of the arrow b, thereby achieving steady support of the low-pressure turbine casings. The transverse anchors in the depressions $C_1$ and $C_3$ are described later.

The depression $C_2$ is provided in a center area between the low-pressure turbine casings. This does not interfere with installation of other devices and reduces a space for installing the transverse anchors 22a and 22b.

In the preferred embodiment, when installing the cubic block 16, a reinforcing bar may be installed in the inner space S4. This improves joint strength between the cubic block 16 and the concrete frame 12 and rigidity of the transverse anchors 22a and 22b.

Figure 12:
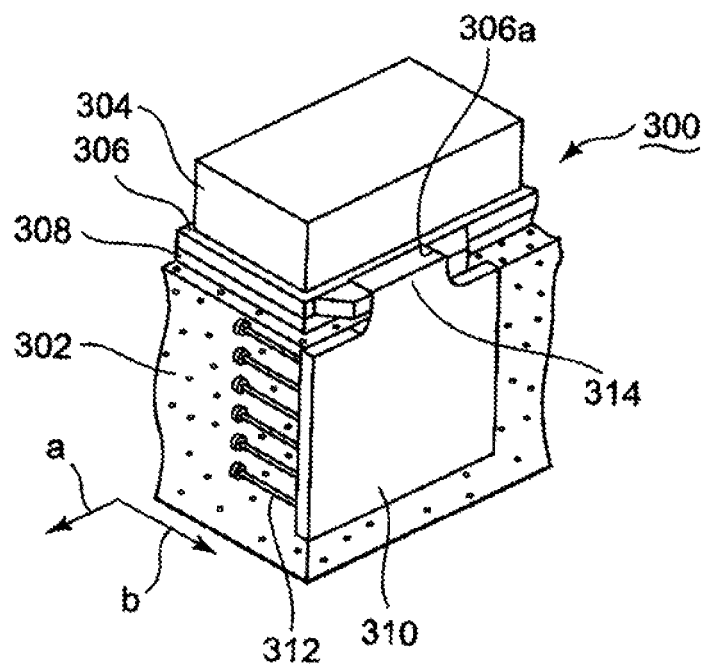
FIG. 12 is a perspective view of a securing apparatus of securing which was devised by the inventors in the process of creating the present invention.

In a manner similar to a securing apparatus shown in FIG. 12, a plurality of stud bolts may be installed inside the cubic block 16, thereby further improving joint strength between the cubic block 16 and the concrete frame 12.

In the case where the bearing housing 35 is formed integrally with the low-pressure turbine casing, the bearing housing 35 is subjected to load of the low-pressure turbine casing and thermal expansion. When the securing apparatus 10 of the preferred embodiment is applied to the bearing box formed integrally with the steam turbine casing, the transverse anchor 22a, 22b can be arranged at a position nearest to the turbine casing LP1 or LP2. This further improves steady support of the turbine casing effectively.

Second Preferred Embodiment

A second preferred embodiment of a method and an apparatus of the present invention is explained in reference to FIG. 3 to FIG. 7. Another example of a securing apparatus of securing the bearing housing by installing in the depression $C_3$ of FIG. 1 a cubic block with a different structure from the cubic block 16 of the first preferred embodiment is described in the preferred embodiment. In the second preferred embodiment, the bearing housing is positioned and secured by a securing apparatus in the direction perpendicular to the direction of the rotor shaft (the direction of the arrow a). The structure of the cubic block 40 of the second preferred embodiment is described hereinafter.

Figure 3:
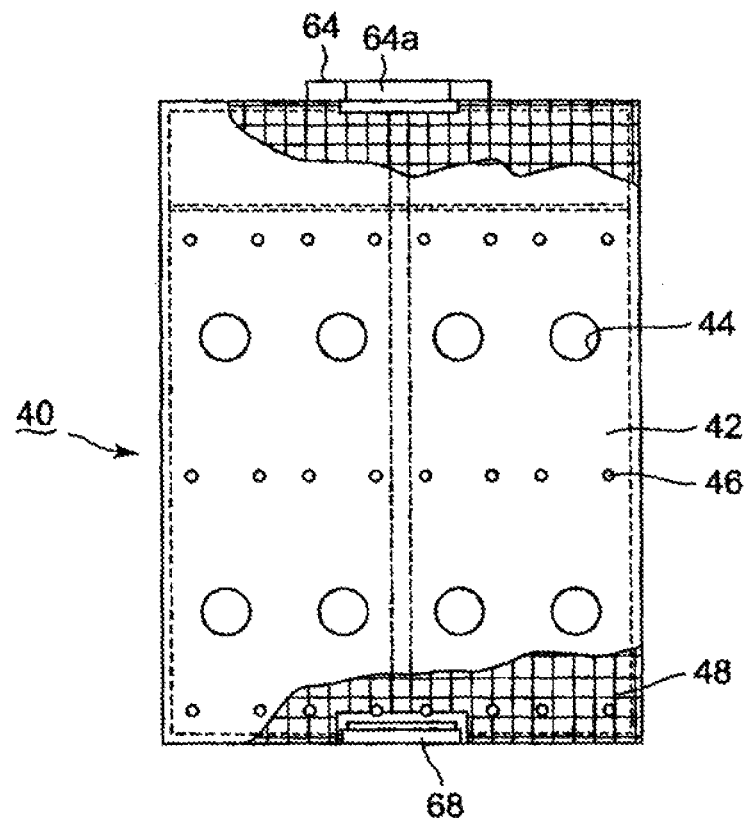
FIG. 3 is a plain view in relation to a second preferred embodiment of a securing method and the securing apparatus.

FIG. 3 shows the cubic block 40 having holes 44 for introducing concrete and air holes 46 in an upper wall 42. The other area of the upper wall 42 is a shield surface. The outer surface of the upper wall 42 is covered by polymer cement and the bearing housing is installed thereon. Grooves 48 are engraved like a grid on the entire outer surface of the upper wall 42 for the polymer cement to easily spread on the outer surface of the upper wall 42. FIG. 3 shows a part of the upper wall 42.

Figure 4:
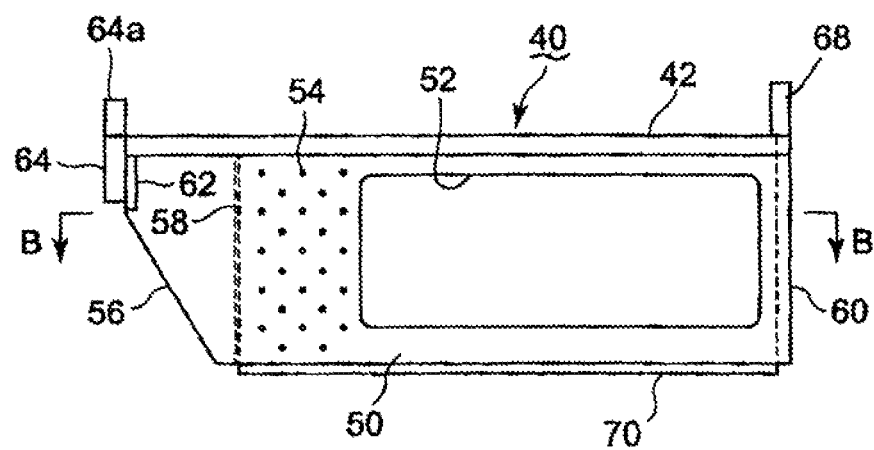
FIG. 4 is a front view of a cubic block in relation to the second preferred embodiment.
Figure 5:
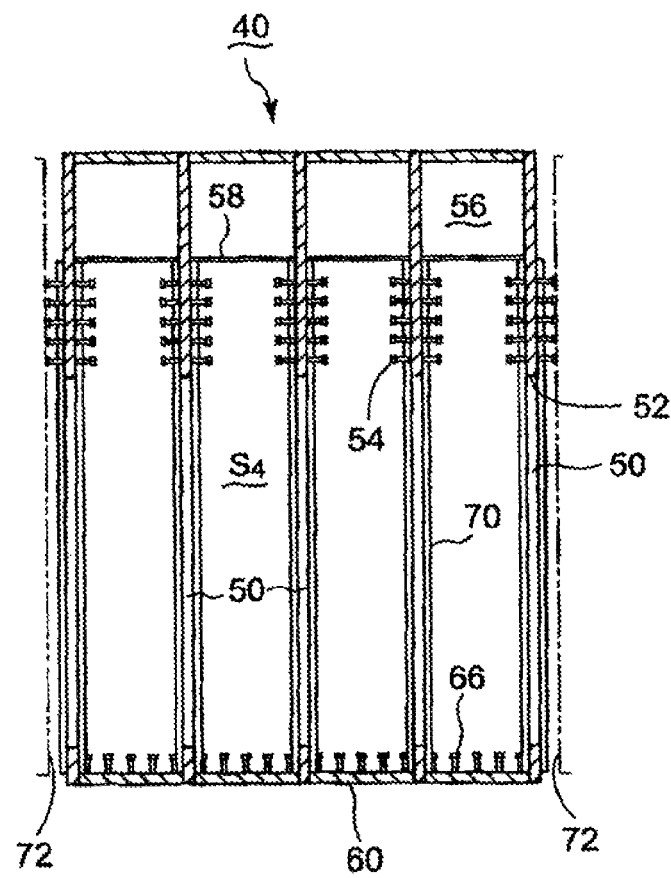
FIG. 5 is a cross-sectional view taken along a line B-B of FIG. 4.

As shown in FIG. 4 and FIG. 5, the cubic block 40 is partitioned inside by a plurality of partition walls 50 which are arranged in parallel to one another at intervals in a longitudinal direction. A pair of outermost partition walls 50 form side surfaces of the long-side of the cubic block 40. Each of the partition walls 50 has an open hole 52. The open hole 52 is arranged at the same position for all of the partition walls 50. An open space is formed by the open holes 52. A plurality of studs 54 are implanted in both sides of each of the partition walls 50. One end of each of the partition walls 50 is downwardly inclined toward the inside. Short-sides of the cubic block 40 are covered by partition walls 58 and 60 that are vertically arranged.

Figure 6:
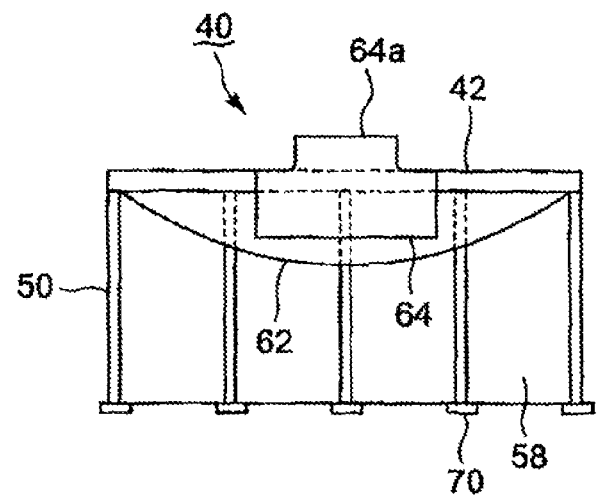
FIG. 6 is a left-side view of a cubic block in relation to the second preferred embodiment.

FIG. 6 shows a supporting plate 62 having a linear upper surface and an arc-like lower surface. The linear supporting plate 62 is constructed between the partition walls 50 above the inclined surface 56. A transverse anchor 64 is connected to the outer surface of the supporting plate 62 and an end surface of the upper wall 42 by fillet welding. A key plate 64a projects upward from the upper wall 42 in a center area of the transverse anchor 64.

Figure 7:
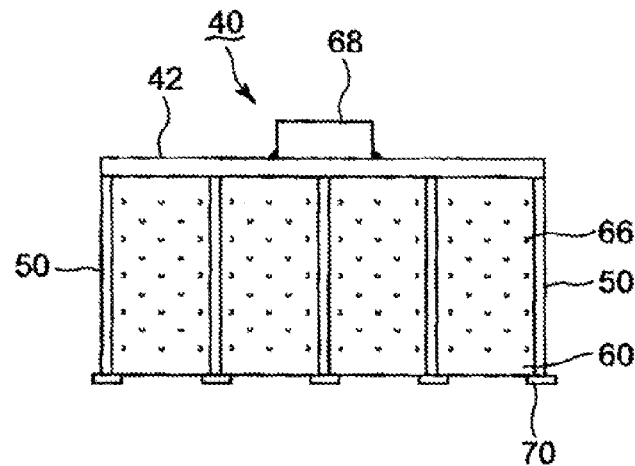
FIG. 7 is a right-side view of the cubic block in relation to the second preferred embodiment.
Figure 8:
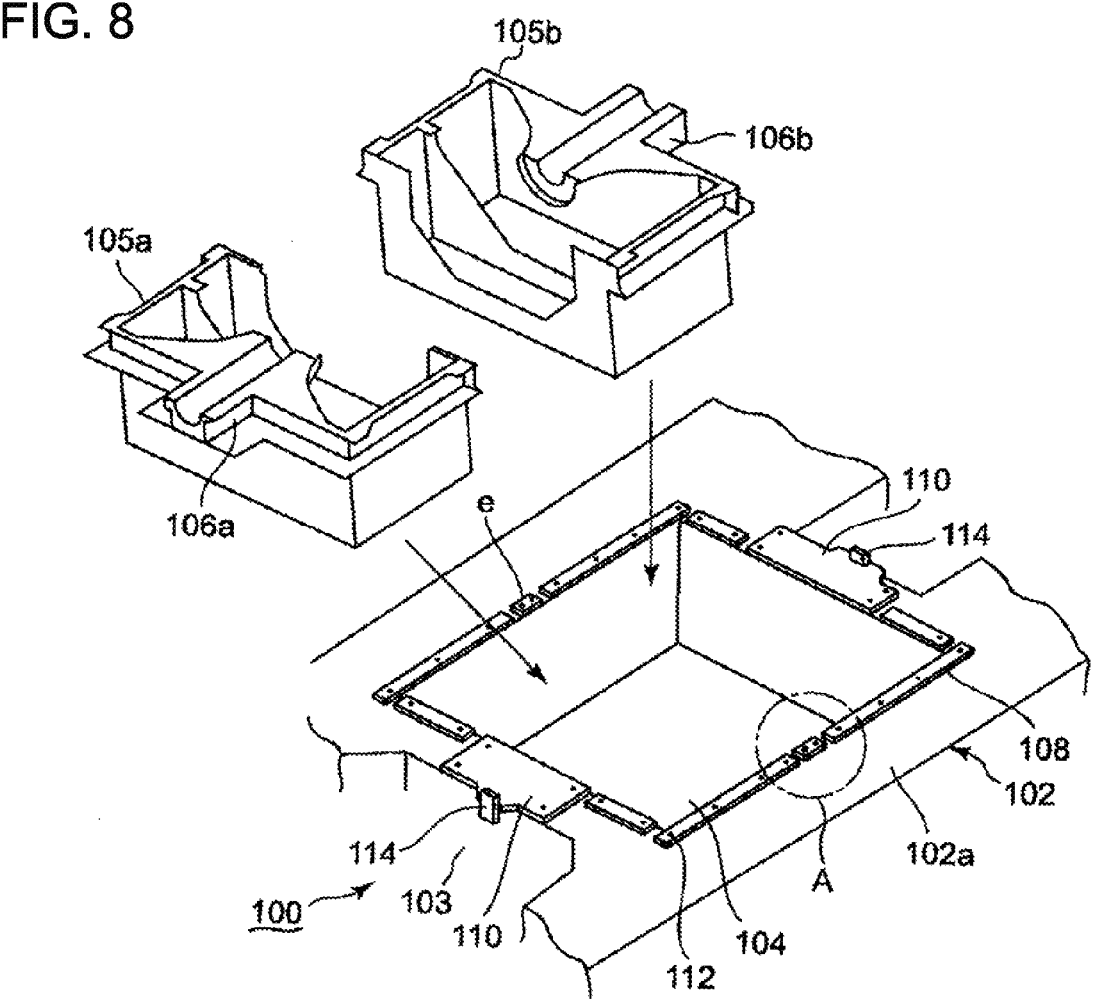
FIG. 8 is a perspective view of a conventional securing apparatus of securing a bearing housing provided in a turbine casing which is formed integrally with the bearing housing.
Figure 9:
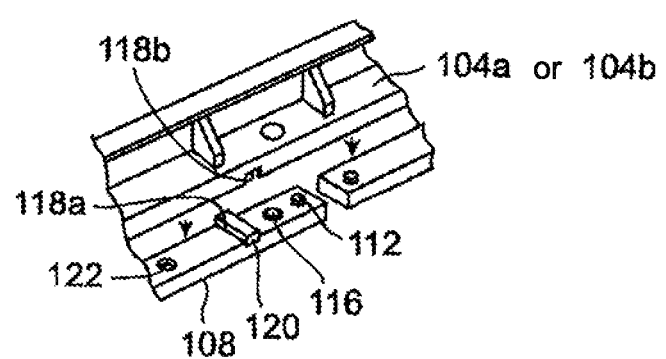
FIG. 9 is an enlarged view of a section A of FIG. 8.
Figure 10:
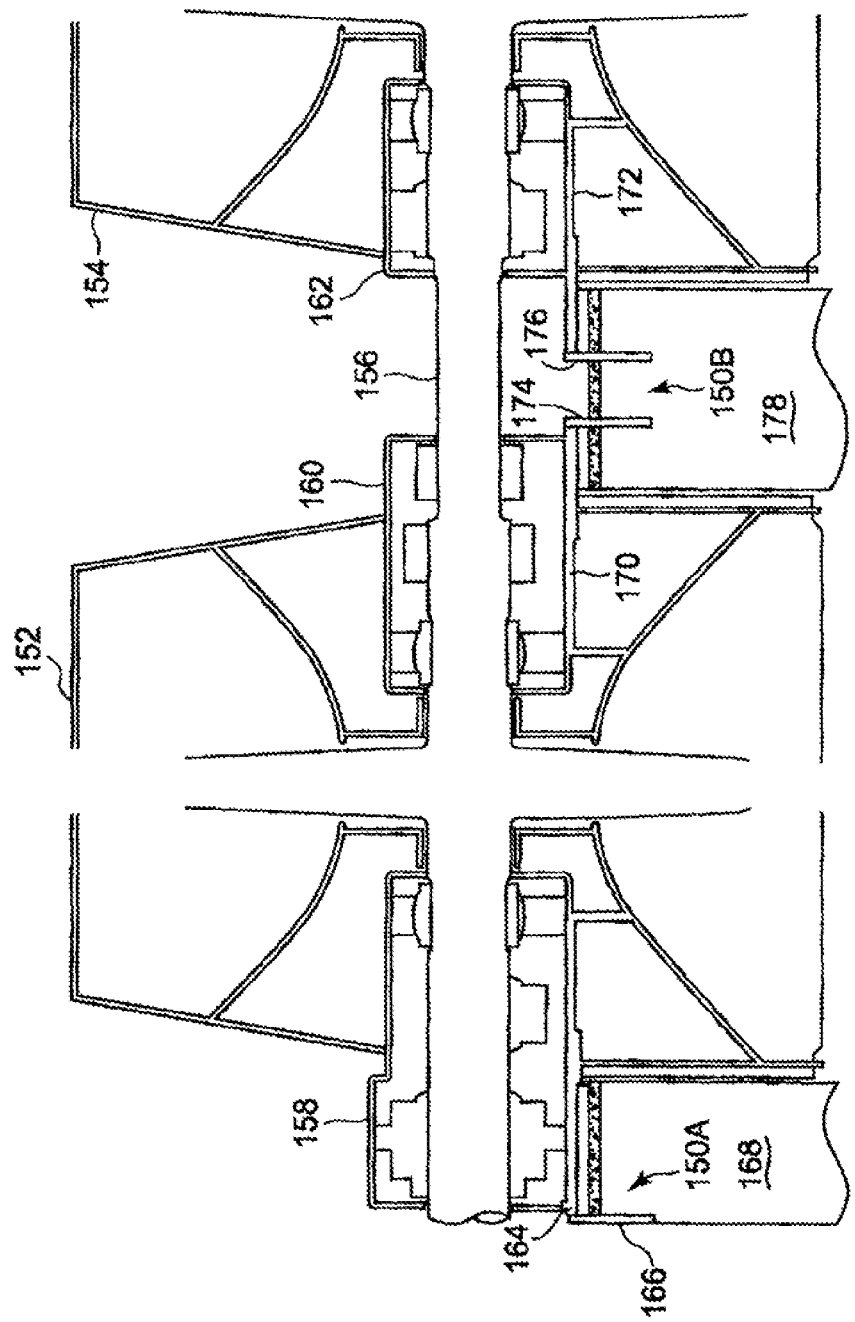
FIG. 10 is a cross-sectional view of another example of a conventional securing apparatus of securing a bearing housing provided in a turbine casing which is formed integrally with the bearing housing.
Figure 11:
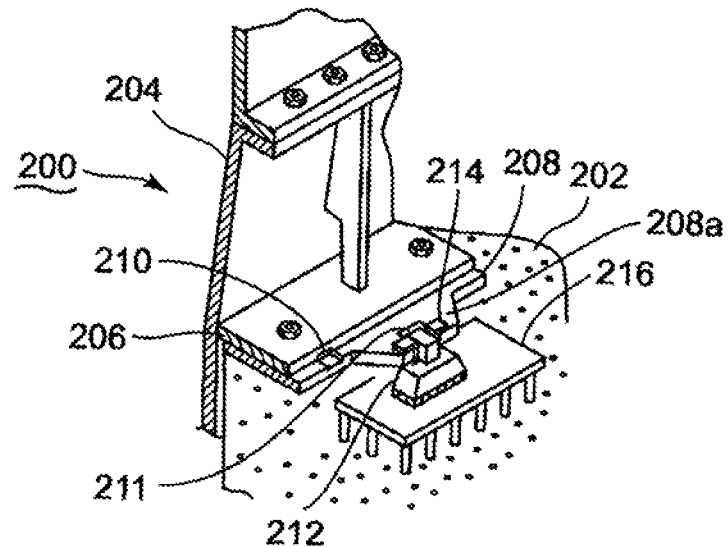
FIG. 11 is a perspective view of a conventional securing apparatus for a turbine casing.

As shown in FIG. 5 and FIG. 7, a plurality of stud bolts 66 are implanted at equal intervals in an inner surface of the partition wall 60. The transverse anchor 68 is welded to the upper wall 42 arranged above the partition wall 60 in such a state that the transverse anchor 68 projects upwardly from the upper wall 42. A base 70 is installed to a bottom of the partition wall 50, leaving the bottom surface of the cubic block 40 open other than the area covered by the base 70. All parts of the cubic block 40 are made of steel. The cubic block 40 has the inner space S4 for receiving concrete.

The cubic block 40 having the above structure is inserted in the depression $C_3$ in such a state that the inclined surface 56 faces the one-stage low-pressure turbine casing LP1. With the cubic block 40 inserted in the depression $C_3$, the transverse anchors 64 and 68 project upward from the supporting surface 14. As shown in FIG. 5, the cubic block 40 is arranged so that the studs 54 installed on the outer surface of each of the outermost partition walls 50 are abutted to a web plate embedded in the concrete surface of the depression $C_3$.

Next, concrete is introduced through the holes 44 for introducing concrete and hardens to in secure the cubic block 40 to the depression $C_3$. Then, the turbine casing and the bearing housing provided separately are installed to the upper wall 42 of the cubic block 40. The key plate 64a of the transverse anchor 64 and the transverse anchor 68 are inserted in a key slot provided in the bedplate fixed to the lower wall of the bearing housing so as to position and secure the bearing housing in the direction of the arrow a.

According to the present invention, the cubic block 40 is embedded in the concrete frame and concrete is placed in the inner space S4 of the cubic block 40 so as to enhance joint strength between the cubic block 40 and the concrete frame 12. Therefore, it is possible to improve rigidity of the transverse anchors 64 and 68 fixed to the cubic block 40.

The load applied to the transverse anchors 64 and 68 from the bearing housing is transmitted to the concrete frame 12 in large contact area via the cubic block 40. Thus, it is possible to improve bearing strength with respect to the bearing housing 35.

Further, the transverse anchors 64 and 68 are formed integrally with the cubic block 40 being made of steel with rigidity. Thus, it is possible to realize the structure with little age deterioration and high reliability.

In the preferred embodiment, the studs 54 and 66 are installed inside the cubic block 40, thereby making the contact area between the cubic block 40 and the concrete much wider. This improves joint strength of the cubic block 40 with respect to the concrete frame 12.

The holes 44 for introducing concrete are formed in the upper wall 42 of the cubic block 40, thereby making it easy to place concrete in the inner space S4 formed inside the cubic block 40.

The transverse anchors 64 and 68 are arranged in the direction of the arrow a and thus, clearance for allowing thermal expansion of the bearing housing 35 in the direction of the rotor shaft (the direction of the arrow b) can be easily formed between each of the traverse anchors 64 and 68 and the base plate of the bearing housing. Thus, it is possible to perform the positioning of the bearing housing in the direction of the arrow a with precision while allowing the thermal expansion.

The transverse anchor 64 is arranged at a position of the cubic block that is nearest to the one-stage low-pressure turbine casing LP1 and the transverse anchor 68 is arranged at a position that is nearest to the high-pressure turbine casing HP. Thus, it is possible to arrange the fixing points of the turbine casings nearest to the turbine casings, thereby achieving steady support of the turbine casings.

In the preferred embodiment, when installing the cubic block 40, a reinforcing bar may be installed in the inner space S4. This improves joint strength between the cubic block 40 and the concrete frame 12. This improves bearing strength of the bearing housing.

As a modified example of the second preferred embodiment, the cubic block which is secured to the depression $C_1$ in FIG. 1, is used to position and secure the bearing housing arranged above the depression $C_1$ in the direction of the arrow a.

The depression 1 faces the storing space only on one side thereof. Thus, a cubic block 80 having one transverse anchor 64 is used. The cubic block 80 is the cubic block 40 without the transverse anchor 68.

The cubic bock 80 is installed and secured in the depression $C_1$ so that the inclined surface 56 and the transverse anchor 64 are on the side nearer to storing space $S_1$. By this, the transverse anchor 64 is arranged at a position of the cubic block 80 that is nearest to the two-stage low-pressure turbine casing LP2. Then, the transverse anchor 64 is inserted in the key groove which is formed in the bedplate fixed to the lower wall of the bearing housing, thereby positioning and securing the bearing housing in the direction of the arrow a.

In this modified example, the same effects as the first and second preferred embodiments can be obtained. In the depression C4, a bearing unit for supporting a shaft end of the rotor shaft or the like may be installed and secured.

In the first and second preferred embodiments, the securing apparatus of securing the bearing housing of the separate turbine casing type. The present invention can be also applied to securing the integral turbine casing type.

INDUSTRIAL APPLICABILITY

According to the present invention, it is possible to provide a securing apparatus with high reliability, by which the bearing housing for supporting the rotation shaft of the large rotation machine such as a steam turbine and a compressor on a base frame and which has high rigidity, high supporting strength with respect to the bearing housing and high reliability.

The invention claimed is:

1. A method of securing a bearing housing in which the bearing housing for a rotation shaft of a rotary machine is positioned and secured on a concrete frame by an anchor member projecting from a supporting surface of the concrete frame, the method comprising the steps of:
    preparing a cubic block which has rigidity and has one pair of opposing surfaces that are open, an inner space for receiving concrete and the anchor member projecting upward at the end of the upper wall;
    housing the cubic block in a depression which is formed on the supporting surface of the concrete frame facing a storing space of the rotary machine, in such a state that the anchor member projects on a side of the storing space from the supporting surface of the concrete frame;
    placing concrete in the inner space of the cubic block so that the cubic block is positioned and secured to the concrete frame; and
    locking the bearing housing by the anchor member so that the bearing housing is positioned and secured to the concrete frame in a direction perpendicular to the rotation shaft.

2. The method of securing the bearing housing according to claim 1, further comprising the step of:
    prior to the step of placing the concrete in the inner space of the cubic block, installing a reinforcing bar through said one pair of opposing surfaces of the cubic block.

3. The method of securing the bearing housing according to claim 1 or 2,
    wherein the rotary machine is a steam turbine and the bearing housing is a bearing housing formed integrally with a steam turbine casing.

4. The method of securing the bearing housing according to claim 1 or 2,
    wherein the rotary machine is a steam turbine and the bearing housing is a bearing housing which is a separate body from a steam turbine casing.

5. The method of securing the bearing housing according to claim 3,
    wherein the cubic block is provided on at least one side of the steam turbine casing in a direction of a rotor shaft, the steam turbine casing and the bearing housing are positioned and secured in a direction perpendicular to the rotor shaft by the anchor member while allowing thermal expansion of the steam turbine casing and the bearing housing in the direction of the rotor shaft.

6. An apparatus for securing a bearing housing in which the bearing housing for a rotation shaft of a rotary machine is positioned and secured on a concrete frame by an anchor member projecting from a supporting surface of the concrete frame, the apparatus comprising:
    a cubic block which has rigidity and has at least one pair of opposing surfaces that are open, an inner space for receiving concrete and the anchor member projecting upward at the end of the upper wall, a depression which is formed on the supporting surface of the concrete frame facing a storing space of the rotary machine and houses the cubic block, in such a state that the anchor member projects on a side of the storing space from the supporting surface of the concrete frame, wherein the cubic block is housed in the depression and the concrete is placed in the inner space of the cubic block so as to secure the cubic block and the bearing housing is locked by the anchor member so as to position and secure the bearing housing to the concrete frame in a direction perpendicular to the rotation shaft.

7. The apparatus for securing the bearing housing according to claim 6, wherein the cubic block has an opening through which the concrete is introduced, the opening being formed in an upper wall of the cubic block and in communication with the inner space of the cubic block.

8. The apparatus for securing the bearing housing according to claim 6 or 7, wherein the rotary machine is a steam turbine and the bearing housing is a bearing housing of an integral casing type which supports a rotor shaft, wherein the depression is provided on at least one side of a storing space for a steam turbine casing formed in the supporting surface of the concrete frame in a direction of the rotor shaft, wherein the anchor member is provided at a position of the cubic block that is nearest to the steam turbine casing, and wherein the bearing housing is positioned and secured in a direction perpendicular to the rotor shaft by the anchor member so as to permit thermal expansion of the steam turbine casing and the bearing housing in the direction of the rotor shaft.

\* \* \* \* \*